United States Patent [19]

Kuharchuk

[11] 3,800,316

[45] Mar. 26, 1974

[54] RECORD CONTROL CIRCUIT FOR MULTI-TRACK CARTRIDGE TAPE PLAYER-RECORDER

[75] Inventor: Phillip J. Kuharchuk, Brookfield, Ill.

[73] Assignee: Motorola, Inc., Franklin Park, Ill.

[22] Filed: Mar. 22, 1971

[21] Appl. No.: 126,739

[52] U.S. Cl. .......... 360/74, 360/78

[51] Int. Cl. .......... G11b 5/44, G11b 5/56

[58] Field of Search .......... 274/4 A, 4 F, 11 A, 11 F; 179/100.2 Z, 100.2 CA, 100.2 S

[56] References Cited

UNITED STATES PATENTS

| | | | |
|---|---|---|---|
| 3,512,784 | 5/1970 | Yamamoto | 274/4 A |
| 3,572,723 | 10/1969 | Jenkins | 274/4 A |
| 3,592,476 | 2/1970 | MacDonald | 274/4 A |

*Primary Examiner*—Louis R. Prince
*Assistant Examiner*—A. J. Mirabito
*Attorney, Agent, or Firm*—R. J. La Porte; Vincent Rauner

[57] ABSTRACT

A control circuit for use in the record mode in a cartridge type tape player-recorder includes a sensor for sensing the conductive strip conventionally provided on a multi-track recording tape to define the ends of the tape tracks, for the purpose of energizing a relay which disables the tape drive motor to discontinue the recording process. A program switch connected to the circuitry may be positioned so that the tape drive is disabled in accordance with the sensing of the conductive strip, subsequent to the recordation of information on each set of tape tracks making up a recording channel or subsequent to the recordation of information on a set of tape tracks making up a predetermined one of the recording channels.

5 Claims, 4 Drawing Figures

INVENTOR:
PHILLIP J. KUHARCHUK
BY: Ronald J. LaPorte
ATTORNEY

INVENTOR:
PHILLIP J. KUHARCHUK
BY: Ronald J. La Porte
ATTORNEY

RECORD CONTROL CIRCUIT FOR MULTI-TRACK CARTRIDGE TAPE PLAYER-RECORDER

BACKGROUND OF THE INVENTION

This invention relates generally to cartridge type tape player-recorders for playing and recording information on multi-track tapes enclosed in cartridges received therein and more particularly to circuitry for controlling automatically the operation of the player-recorder during the record mode of operation.

Conventionally, during the recording of information on multi-track tapes enclosed in cartridges inserted into cartridge type tape player-recorders, the recording tape head moves from recording channel to recording channel automatically as each channel is filled with information. The latter is accomplished normally by a device which senses a conductive strip provided at the trailing ends of the tracks on the tape comprising the channels. The sensing of the strip at the end of the tape energizes a solenoid operated cam arrangement which in turn moves the magnetic tape head to the next successive channel.

If the operator does not maintain a close watch of the player-recorder, the tape head will eventually move back to a previously recorded recording channel, resulting in a loss of the originally recorded information if the tape transport is allowed to continue to operate.

The last-mentioned loss of information can occur both in the case of the insertion in the player-recorder of an unrecorded multi-track tape cartridge wherein, subsequent to recording information on all of the channels on the tape, the tape head moves back to the first recorded channel, and also wherein a partially recorded multi-track tape cartridge is inserted into the player-recorder and the tape head moves automatically to a previously recorded channel subsequent to recording information on an unrecorded channel.

SUMMARY OF THE INVENTION

Accordingly, it is a primary object of the present invention to provide in a cartridge type tape player-recorder for recording and playing multi-track tape cartridges and having a tape head movable automatically from recording channel to recording channel during the recording process, control circuitry for preventing the loss of information on previously recorded channels due to the movement of the recording head thereto.

It is a more specific object of the present invention to provide in a tape player-recorder of the above-described type, circuitry for controlling the movement of the tape head from recording channel to recording channel during the recording process.

Briefly, a preferred embodiment of the control circuitry according to the invention includes a relay which is energized during the recording of information on a multi-track tape, upon the sensing of the conductive strip provided on the tape for use in indexing the magnetic tape head from recording channel to recording channel.

The sensor, which conventionally has two elements across which a circuit connection is completed by the passing of the conductive strip to actuate a solenoid operated tape head indexing mechanism, includes a third element. The conductive strip completes a circuit between the third element and the grounded element of the above mentioned two elements to operate the relay. One set of contacts of the relay is connected in series with the drive motor for the capstan shaft driving the tape through the cartridge. Thus, upon energization of the relay, the tape drive motor is deenergized. Another set of contacts of the relay is connected to a programing switch which provides a holding circuit for the relay to maintain the tape drive disabled after the conductive strip moves past the sensor.

In a first setting, the programing switch provides an electrical ground to hold the relay operated each time the conductive strip is sensed; i.e., after each recording channel is recorded, and in a second setting the holding circuit is provided only when the tape head is moved to a predetermined one of the recording channels. The latter is accomplished by connecting the programing switch to a rotary switch which is coupled to the tape head indexing mechanism. The rotary switch upon being moved to the first setting corresponding to a first recording channel, supplies the necessary electrical ground through the programing switch to provide a holding circuit for the relay. In the other settings, corresponding to the remaining channels, no ground is provided, thus the relay drops out and the recording continues.

DETAILED DESCRIPTION

Figures 1, 2:
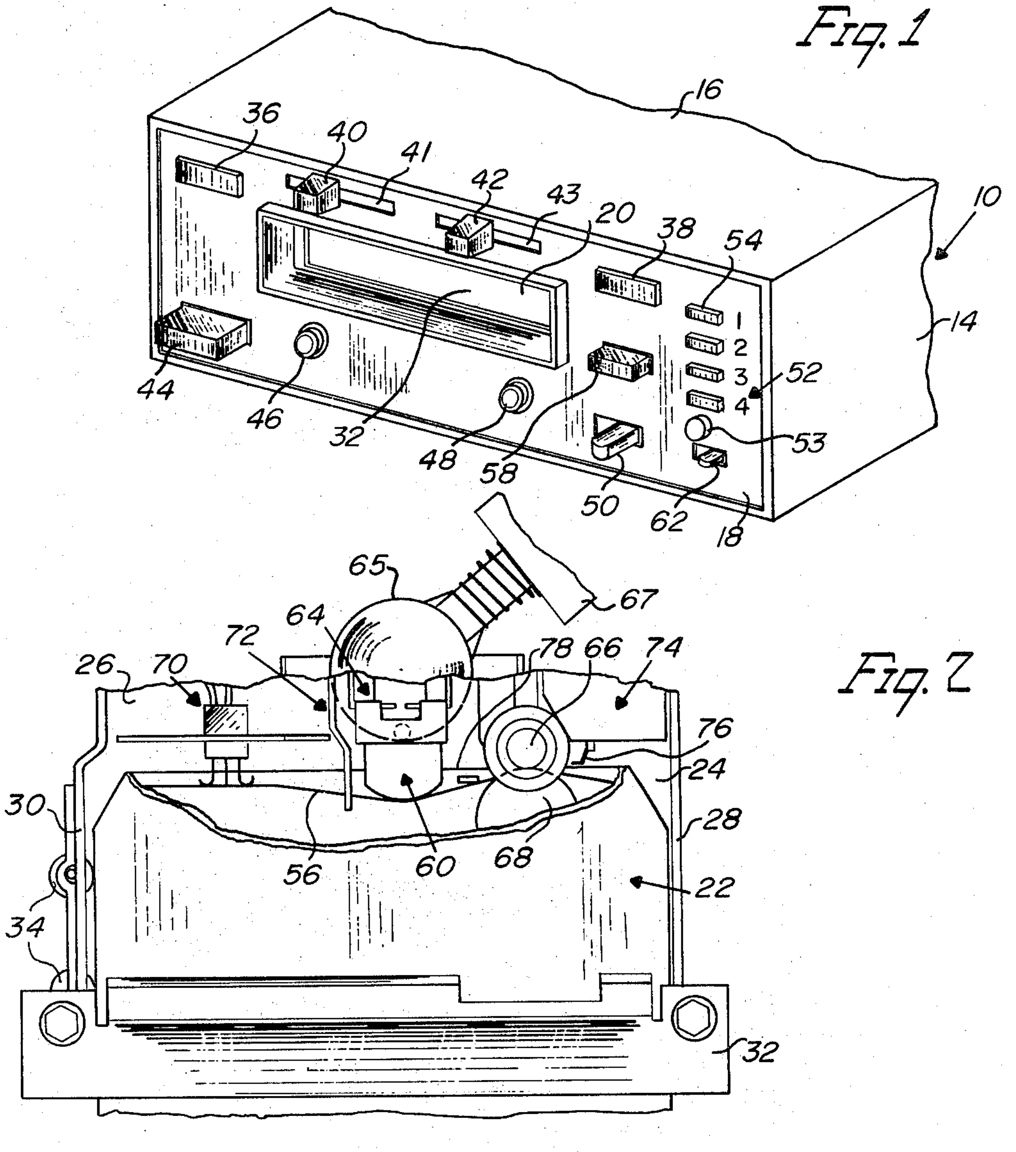
FIG. 1 is a fragmentary perspective view of a tape player-recorder incorporating record control circuitry according to the invention.
FIG. 2 is a fragmentary, partially sectioned, top, plan view of the cartridge receiving cavity and tape playing and recording instrumentalities of the player-recorder of FIG. 1.
Figure 4:
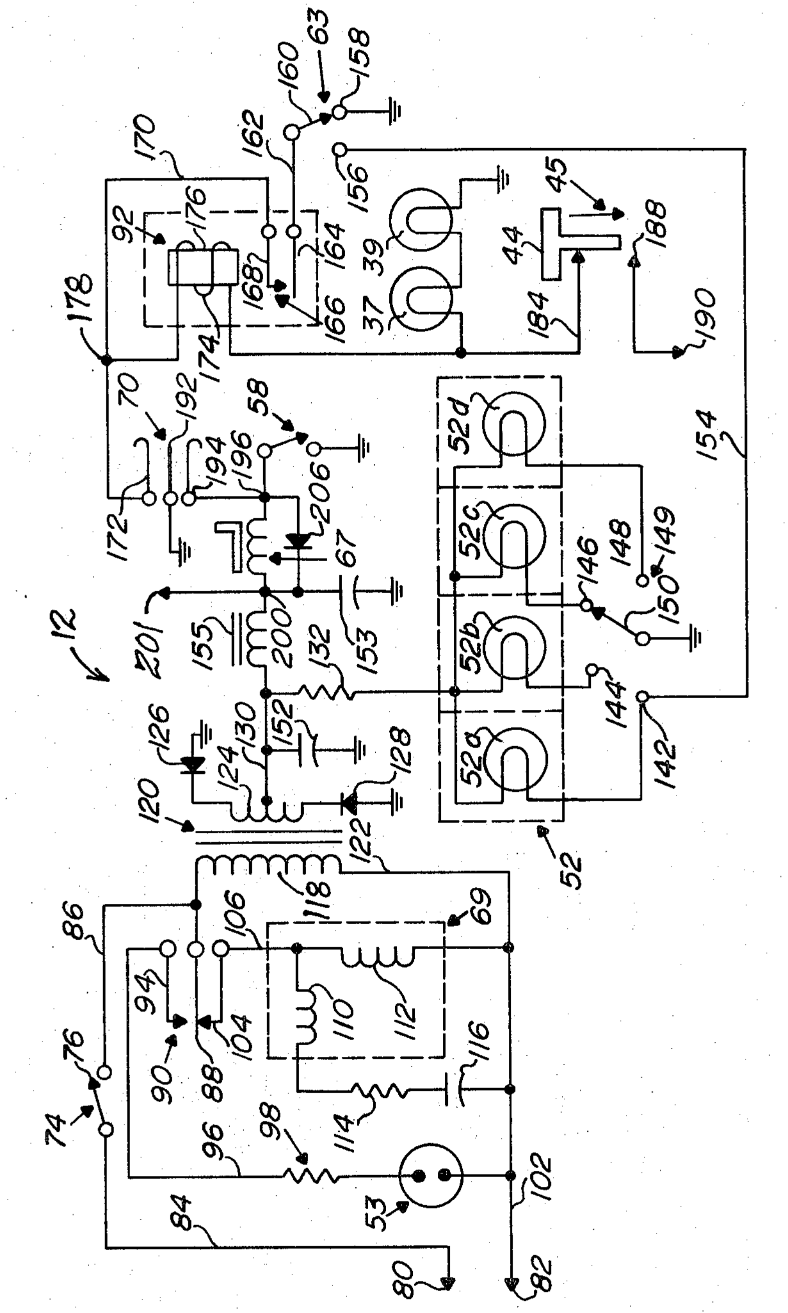
FIG. 4 is a schematic diagram of the record control circuitry according to the invention.

Referring now to the drawings in greater detail wherein like numerals have been employed to designate similar components throughout the various views, there is illustrated in FIG. 1 an 8-track, stereo cartridge type tape player-recorder 10 including control circuitry 12 as shown in FIG. 4 according to the invention.

The cartridge player-recorder 10 includes a housing comprising side walls, such as 14, top and bottom walls, such as 16, interconnecting the side walls and a front wall 18.

A cartridge receiving opening 20 is provided in front wall 18 through which cartridges such as 22 (FIG. 2) are inserted for receipt in the cartridge receiving cavity 24 formed in the player-recorder and defined by internal base wall 26 and side walls 28, 30. A hinged door 32 is mounted in opening 20.

A plurality of controls and indicators are mounted on front wall 18 of the player-recorder. Two recording level indicators 36, 38, one for each recording channel of the player-recorder, are located on opposite sides of opening 20. The level indicators are illuminated by a pair of lamps 37, 39 (FIG. 4) upon placing the player-recorder 10 into the "record" mode of operation. A pair of slidable volume control knobs 40, 42 extend from wall 18 through elongated openings 41, 43 respectively.

A mode selector knob 44, which operates a switch 45 (FIG. 4) to select a "record" or "play" mode of operation for the player-recorder 10 in accordance with the depression or release, respectively, thereof, extends from front wall 18 at the lower left hand side thereof as seen in FIG. 1. A pair of microphone jacks 46, 48 is provided beneath opening 20, and a "pause" button 50 with which an operator can discontinue momentarily the recording or playing process, extends from front wall 18 adjacent jack 48.

A lighted recording channel indicator 52 is provided at the right hand side of the front wall 18 of the player-recorder. The indicator includes a plurality of individually lighted sections, in the case of the 8-track stereo player shown herein, four sections such as 54, are provided to represent the four stereo recording channels, each of the channels including a pair of tape tracks. The sections are lighted by lamps **52*a*, 52*b*, 52*c* and 52*d* (FIG. 4) in accordance with the channel on a tape 56 in cartridge 22 being played or recorded. A shut-off lamp 53 is positioned directly below channel indicator 52 for indicating that the control circuit 12 is operated to discontinue the recording process. A selector button 58 is provided beneath level indicator 38 and adjacent indicator 52 for manually changing the position of the magnetic tape head 60 (FIG. 2) in the player-recorder with respect to the various tracks on the magnetic tape making up the recording channels. The operation of the instrumentalities to accomplish the indexing of tape head 60** with respect to the tape will be described in detail hereinafter.

A selector 62 for a two-position automatic shut-off switch 63 (FIG. 4) extends from front wall 18 beneath shut-off indicator lamp 53. The positioning of selector knob 62, as will be explained in greater detail hereinafter, programs the control circuit 12 (FIG. 4) for operation during the "record" mode to shut off the player-recorder tape drive motor after recording each channel on the magnetic tape 56, or after all of the channels on the tape have been recorded, respectively.

Referring now to FIG. 2 of the drawings, there is shown therein the internal tape cartridge receiving cavity 24, described heretofore. As seen in the figure, a guide bar or plate 32 is mounted opposite base wall 26 and extends between the walls 28, 30, and a pair of guide rollers 34 are mounted on and extend through apertures formed in side wall 30 into cavity 24 to guide a cartridge inserted into opening 20 into the cavity.

A cartridge 22 is shown in the inserted position in cavity 24 with the tape 56 therein in engagement with magnetic tape head 60. The tape head 60 is mounted for movement with respect to tape 56 by means of a mounting and indexing arrangement 64. Such an arrangement can be seen in co-pending U. S. Pat. application, Ser. No. 567,126, filed July 22, 1966, and assigned to the same assignee as the instant invention. The tape head mounting arrangement is operated to move the tape head incrementally from recording channel to recording channel, transverse the direction of movement of the tape through the cartridge 22, by a rotatable cam arrangement 65 operated by a solenoid 67, shown also in FIG. 4 of the drawings. A detailed explanation of the operation of such a cam and solenoid arrangement is described in co-pending U. S. Pat. application, Ser. No. 834,076, filed June 17, 1969, and assigned to the same assignee as the instant invention.

A capstan drive shaft 66 is mounted for rotation on wall 26 and extends upwardly therefrom, substantially perpendicular thereto. The capstan shaft 66 is mounted for engagement with a drive roller 68 mounted within cartridge 22. The tape 56 is pinched between the contacting shaft and roller to permit the shaft to propel the tape through the cartridge 22. The capstan drive shaft 66 is driven in a conventional manner by a drive motor 69 (FIG. 4) and flywheel arrangement (not shown).

Figure 3:
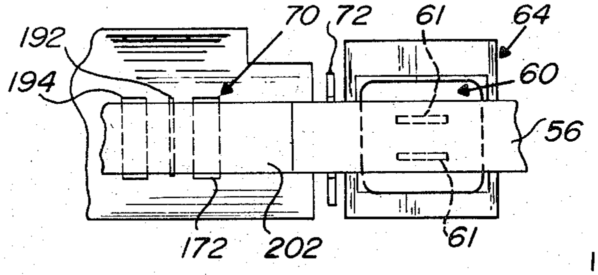
FIG. 3 is an enlarged, fragmentary, front view of the tape recording and playing instrumentalities of FIG. 2, illustrating the relationship thereof with a conductive strip provided on the magnetic tape enclosed in a cartridge inserted in the tape cartridge receiving cavity of the player-recorder.

A three-element switch or sensor 70 is mounted on wall 26. The elements extend into cartridge 22 for engagement with tape 56. The function of switch 70 will be described hereinafter. A tape guide 72 is also mounted on wall 26 adjacent tape head 60 to insure the correct alignment of the track pairs on tape 56 making up the stereo recording channels with the magnetic pick-ups 61 of the tape head (FIG.3).

A power on-off switch 74 is mounted adjacent capstan drive shaft 66. A switch arm 76 extends from switch 74 into cavity 24 for engagement with the leading edge 78 of cartridge 22 inserted thereinto. Engagement of the switch arm 76 by cartridge 22 when inserted into cavity 24, operates switch 74 to provide power to the player-recorder 10. The drive motor 69 for capstan shaft 66 is actuated along with the other instrumentalities of the player-recorder at this time also.

Referring now to FIG. 4 of the drawings there is illustrated therein the record control circuitry 12 according to the invention. The circuit is powered by a 120 volt a.c. source (not shown) such as a conventional household outlet, connected at inputs 80, 82. Lead 84 connects input 80 to the power on-off switch 74 described earlier. Lead 86 coming from the opposite side of switch 74 is connected to the armature 88 of "break-make" contacts 90 of the automatic shut-off relay 92, shown at the right hand side of the figure.

The "make" contact 94 of contact set 90 is connected, via lead 96 through a resistor 98 to the automatic shut-off indicator lamp 53. The lamp in turn is connected via lead 102 to input 82.

"Break" contact 104 of contact set 90 is connected by lead 106 to synchronous drive motor 69 for capstan shaft 66, illustrated by a pair of windings 110, 112, the former connected through series resistor and capacitor combination 114, 116, respectively, via lead 102 to input 82, and the latter connected directly to lead 102 and input 82.

Lead 86 is connected also to the armature 88 of contact set 90 and to one side 118 of the primary of a transformer 120. The other side 122 of the transformer primary is connected via lead 102 to input 82.

The secondary 124 of transformer 120 is connected at both ends through voltage rectifying diodes 126, 128, respectively, to ground. A center tap lead 130 is connected through resistor 132 to one side of lamps **52*a*, 52*b*, 52*c*, 52*d* of the lighted channel indicator 52 described heretofore; each lamp representing a recording channel, i.e., channels 1–4, respectively. Each of the lamps is connected in turn to a respective terminal 142, 144, 146, 148, of a rotary switch arrangement 149 coupled mechanically to cam arrangement 65. The armature 150 of the switch arrangement is connected to ground potential in a clockwise direction as seen in FIG. 4 and is moved from terminal to terminal in accordance with the operation of the tape head indexing cam arrangement. Electrical filtering components including capacitors 152, 153 and filter choke 155 likewise are connected to lead 130.**

The first lamp terminal 142 of the lighted channel indicator, representing recording channel number 1, is connected by lead 154 to a first terminal 156 of automatic shut-off selector switch 63 described above. A second terminal 158 of the last-mentioned switch is connected to ground, and the armature 160 of the switch, which is movable between terminals 156, 158 through the movement of button 62 (FIG. 1) is connected to a lead 162 which interconnects the armature 160 with the armature 164 of "make" contacts 166 of automatic shut-off relay 92. The "make" contact side of contacts 166 is connected over lead 170 to a first contact 172 of switch 70 described heretofore.

The energizing coil or winding 174 would about core 176 of relay 92, is connected at a first end at junction 178 to lead 170. The opposite end of winding 174 is connected to the record indicator lamps 37, 39, which are connected in turn to ground and to one side 184 of record playback mode selector switch 45 mentioned above. The opposite side 188 of switch 45 is connected to a d.c. voltage source at terminal 190.

Referring again to switch 70, the center contact 192 thereof is connected to ground, and the other contact 194 is connected at junction 196, both to the manual selector switch 58 and to solenoid 67 for moving the tape head indexing arrangement 64 of FIG. 2.

The solenoid 67 is connected in turn at junction 200 to d.c. potential supplied at point 201 and to the filter choke 155 used in conjunction with a capacitor 153 for filtering purposes. A diode 206 is connected in parallel with solenoid coil 67.

For purposes of affording a more complete understanding of the invention, it is advantageous now to provide a functional description of the mode in which the component parts thusfar described cooperate.

AUTOMATIC SHUT-OFF

AFTER RECORDATION OF EACH RECORDING CHANNEL

To program the control curcuit 12 to discontinue the operation of the player-recorder 10, i.e., tape drive motor 69, subsequent to the recordation of information on each one of the four stereo tape track pairs or channels, the armature 160 of switch 63 is moved to the grounded terminal 158, as shown in FIG. 4.

Next, to place the player-recorder 10 in the record mode, mode selector button 44 is depressed (i.e., moved in the direction of the arrow in FIG. 4) to close switch 45. At the same time, a cartridge 22 is inserted into cavity 24.

Upon insertion of the cartridge into the cavity, the leading edge 78 of the former engages switch arm 76 to actuate power on-off switch 74. The actuation of the last-mentioned switch provides power from the a.c. source at inputs 80, 82 (FIG. 4) to energize drive motor 69 for the capstan drive shaft 66 and to supply d.c. voltage via transformer 120 to the remaining portion of the circuit.

The depression of button 44 as described simultaneously with the insertion of the cartridge into cavity 24, completes a connection between leads 184, 188, providing d.c. voltage from point 190 to automatic shut-off relay 92 and to record indicator lamps 37, 39 for illumination of the level indicators 36, 38 (FIG. 1). The relay 92 is not energized at this time, however, since the circuit to winding 174 thereof is not as yet completed.

The recording process is commenced upon insertion of cartridge 22 into cavity 24. A conductive strip 202, (FIG. 3), conventionally a piece of aluminum foil extending the width of the tape, is provided on tape 56 at a predetermined location to define the ends of the tape tracks. After a first stereo tape track pair of recording channel has been recorded, the conductive strip comes into alignment and contacting engagement with elements 172, 192 and 194 of switch 70 (FIG. 3). As the conductive strip passes, it completes a first circuit connection between the grounded center element 192 and the element 194 to energize solenoid 67, thereby, through the rotation of the cam of arrangement 65, (FIG. 2) adjusting the position of magnetic tape head 60 and pick-ups 61 thereof with respect to the tape. The pick-ups 61 on magnetic tape head 60 are moved into alignment with the tape tracks comprising the next successive recording channel on tape 56. Likewise, the armature 150 of rotary switch 149, which is mechanically linked with cam 65, is moved to the corresponding lamp terminal to illuminate a respective one of the lamps, thereby to identify the channel being recorded.

While the latter is taking place, a second circuit connection is made by the passing of conductive strip 202, between grounded element 192 and element 172 to complete a circuit for the automatic shut-off relay 92. Upon energization of relay 92, armature 88 of contact set 90 is moved from "break" contact 104 to "make" contact 94, thereby opening the circuit to tape drive motor 69 and closing a circuit to the automatic shut-off indicator lamp 53. Simultaneously with the latter, "make" contacts 166 are closed to provide, via lead 162 and grounded terminal 158, a holding circuit for relay 192.

So long as relay 92 is energized, the recording of information is discontinued, even though the power on-off switch 74 is held operated by the inserted cartridge 22.

To operate the player-recorder 10 for recordation of the next successive recording channel, the automatic shut-off switch 63 may be moved momentarily from the position shown in FIG. 4 to the other position, whereat armature 160 contacts terminal 156. The switch operation opens the ground path from the grounded terminal 158 to relay 92, deenergizing the relay and permitting power to be restored to the drive motor circuit.

The last-mentioned operation of switch 63 eliminates the necessity of removing the tape cartridge 22 from cavity 24 to deenergize relay 92 by the removal of power from the circuit through switch 74. The latter method, may nevertheless be employed if desired.

If the armature 50 of rotary switch 149 is in the position contacting terminal 142, corresponding to the recording channel designated number one, the above described operation of switch 63 will not suffice to reoperate the player-recorder since armature 159 likewise will be connected to ground. In that case, the cartridge must be removed from the player and reinserted. Normally, however, the cartridge at that time will have been fully recorded, and will be removed from the player-recorder to permit the insertion of a blank cartridge.

AUTOMATIC SHUT-OFF

AFTER RECORDATION OF ALL RECORDING CHANNELS

In the event one wishes to record information on a tape in a cartridge inserted into player-recorder 10, and to discontinue the operation thereof only after all, in this case four, recording channels have been recorded, the switch arm 160 of switch 63 is moved to engage terminal 156. In addition, the tape head 60 must be moved into alignment with the tape track pair making up the first recording channel so that armature 150 is placed at terminal 142 corresponding thereto. In the event the tape head is not already positioned with respect to the first channel, the manual tape head indexing switch 58 can be used to energize solenoid 67 and thereby position the tape head properly. The latter causes armature 150 of switch 149 to be moved to terminal 142, to illuminate the lamp 52*a*, indicating the position of the tape head. The operator thereafter proceeds with the recordation of information on the tape as described in the above example.

After the first channel has been recorded, the conductive strip 202 passes and comes into contact with elements 192, and 194 of the switch 70 to complete the first circuit connection for energization of the solenoid 67. The latter causes the rotation of the cam of arrangement 65 (FIG. 2) to adjust the position of tape head 60 and magnetic pick-ups 61 thereof, with respect to the track pair on tape 56 making up the next successive channel. Likewise, rotary switch 149 which is mechanically coupled with the cam arrangement, is actuated to rotate armature 150 from the first lamp terminal 142 clockwise to the next terminal 144 corresponding to the second recording channel.

While the latter is taking place, the second circuit connection is also made by conductive strip 202 contacting the grounded center element 192 and element 172. The second circuit connection only momentarily energized relay 92, however, since the conductive strip moves past the switch 70 and no holding circuit is provided. This is explained as follows. The grounded armature 150 of rotary switch 149 is not connected to terminal 142 and lead 154, consequently, no ground is provided to the holding circuit through contacts 166 of relay 92. Thus, relay 92 is deenergized immediately after the conductive strip passes the switch 70, permitting the player-recorder to continue to operate. The latter occurs at the completion of each of the recording channels until the rotary switch armature 150 is returned to terminal 142. At that time, ground is provided over lead 154 to the holding circuit, thereby to maintain the relay 92 energized, and the player-recorder drive motor 69 inoperative.

If the recording process is not begun with armature 150 of switch 149 in engagement with terminal 142, only the recording channels between the starting terminal and terminal 142 will be recorded prior to the player-recorder 10 becoming inoperative. Thus, as an example, if armature 150 is positioned at terminal 146 corresponding to the third channel on tape 56, as shown in FIG. 4, only the third and fourth recording channels are recorded prior to the drive motor 69 becoming inoperative, since the rotary switch 149 is operated in a clockwise direction as shown in FIG. 4. Thus, to insure the recordation of information on all of the channels on a tape in a cartridge inserted into player-recorder 10, it is important that the magnetic tape head 60 and armature 150 of the rotary switch 149, be moved initially to a position corresponding to the first channel. The unrecorded channels, i.e., one and two, may be recorded thereafter, however, by placing the program switch in the position as shown in FIG. 4, with the armature 160 in contact with terminal 158. Then, the armature 150 of rotary switch 149 can be stepped to terminals 142, 144 to record the corresponding channels as described heretofore in the section entitled AUTOMATIC SHUT-OFF AFTER RECORDATION OF EACH RECORDING CHANNEL.

Thus, the control circuit according to the invention provides an efficient means to insure the accurate recordation of information in a multi-track tape cartridge while minimizing the chance of loss of the information due to inattentiveness on the part of the operator. Furthermore, the circuit is compatible with conventional multi-track tape cartridges and player-recorder mechanisms since it utilizes the conductive strip of foil commonly provided on each tape cartridge and the sensing of the strip to accomplish the above.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A cartridge type tape player-recorder for playing and recording information on the multi-track tape in a tape cartridge, a predetermined number of said tracks comprising a recording channel, said tape including a predetermined number of recording channels, each said tape including a tape portion at a predetermined location thereon defining the relative ends of the tracks on the tape, said player recorder comprising, in combination; a magnetic tape head mounted for engagement with said tape for recording information thereon, tape head indexing means for moving said tape head incrementally from recording channel to recording channel along a path adjacent said tape, tape drive means engageable with said tape for propelling the latter through said cartridge past said tape head, sensing means for sensing said tape portion, said tape head indexing means in response thereto moving said tape head to a successive channel and tape drive shut-off circuit means coupled electrically to said sensing means and said tape drive means, said circuit means including a programing switch movable to first and second settings, said circuit means being operable when said programing switch is in said first setting, in response to the sensing of said tape portion, to disable said tape drive means regardless of the recording channel with respect to which said tape head is moved, and when said programing switch is in said second setting, in response to the sensing of said tape portion, only while said tape head is positioned with respect to a predetermined one of said recording channels, to disable said tape drive means.

2. A cartridge type tape player-recorder as claimed in claim 1 wherein tape portion comprises an electrically conductive strip and wherein said sensing means comprises a three element electrode mounted for engagement with said tape, whereby the passage of said conductive strip in engagement with said elements completes a first circuit between first and second ones of said elements, thereby to actuate said tape head indexing mechanism and a second circuit between said second and a third one of said elements to actuate said tape drive shut-off circuit means.

3. A cartridge type tape player-recorder as claimed in claim 1 wherein said shut-off circuit means includes a relay connected to said sensing means operable to disable said tape drive means upon being energized, said relay being energized in response to the passage of said tape portion past said sensing means and wherein said programing switch, in said first setting, actuates a holding circuit to said relay each time said tape portion is sensed, whereby said tape drive means is disabled in response to any sensing of said tape portion, and in said second setting, actuates a holding circuit to said relay only when said tape portion is sensed and while said tape head is positioned with respect to a predetermined one of said recording channels.

4. A cartridge type tape player-recorder as claimed in claim 3 further including channel indicator means coupled to said tape head indexing means for operation therewith, said indicator means including switch means having a plurality of positions equal in number to the number of recording channels on said tape, said switch means being movable incrementally to corresponding ones of said positions in accordance with the movement of said tape head from channel to channel, whereby said indicator means indicates the channel being recorded, said switch means being connected electrically to said programing switch and upon the latter being operated to said second setting and the former being moved to a predetermined position corresponding to a predetermined one of said recording channels, said switch means actuating said holding circuit for said relay, thereby to disable said tape drive means.

5. A cartridge type tape player-recorder as claimed in claim 4 further including automatic shut-off indicator means connected to said relay and operable in response to the energization of said relay to indicate the cessation of the recording of information.

* * * * *